(12) United States Patent
Teranishi et al.

(10) Patent No.: US 6,328,313 B1
(45) Date of Patent: Dec. 11, 2001

(54) GASKETS

(75) Inventors: Minoru Teranishi; Takao Kinoshita, both of Osaka-fu (JP)

(73) Assignee: Nippon Gasket Co., Ltd., Osaka-fu (JP)

( * ) Notice: Subject to any disclaimer, the term of this patent is extended or adjusted under 35 U.S.C. 154(b) by 0 days.

(21) Appl. No.: 09/437,471

(22) Filed: Nov. 1, 1999

(30) Foreign Application Priority Data

Nov. 13, 1998 (JP) .................................................. 10-323809

(51) Int. Cl.[7] .............................. F16J 15/10; F02F 11/00
(52) U.S. Cl. ............................ 277/592; 277/593; 277/596
(58) Field of Search .................................... 277/592, 593, 277/596

(56) References Cited

U.S. PATENT DOCUMENTS

| | | | |
|---|---|---|---|
| 3,737,169 | * | 6/1973 | Glynn . |
| 3,740,062 | * | 6/1973 | Robins . |
| 4,828,275 | * | 5/1989 | Udagawa . |
| 5,322,299 | * | 6/1994 | Terai . |
| 5,634,646 | * | 6/1997 | Miyaoh . |
| 6,070,882 | * | 6/2000 | Abe et al. . |

FOREIGN PATENT DOCUMENTS

| | | |
|---|---|---|
| 04-357371 | 12/1992 | (JP) . |
| 08-285086 | 11/1996 | (JP) . |
| 09-089114 | 3/1997 | (JP) . |

\* cited by examiner

*Primary Examiner*—Lynne H. Browne
*Assistant Examiner*—John L. Beres
(74) *Attorney, Agent, or Firm*—Browdy and Neimark

(57) ABSTRACT

A gasket comprises a thin plate to be arranged between confronting surfaces of a cylinder block and a cylinder head. The thin plate has attached with adhesives susceptible to plastic deformation at areas where the thin plate comes in mating with the confronting surfaces. The adhesives come in adhesion with the confronting surfaces to restrain relative displacement that might occur constantly between the mating surfaces of the plate and the confronting surfaces. This contributes to keeping the gasket stiff. The adhesives of plastic deformation property are arranged along peripheries of cylinder bore holes at the areas where the thin plate comes in mating with the confronting surfaces. The adhesives, when have come in adhesion with the confronting surfaces, not only establish the reliable head-to-block sealing, but also restrain the displacement that might occurs constantly between the mating surfaces, in favor of plastic deformation of the adhesives. In addition, the elastic deformation of the adhesives absorbs a transitory displacement. The adhesives may hold a decline in spring constant to a minimum to keep the gasket from the fatigue failure that might otherwise occur at or nearby beads in the gasket.

13 Claims, 3 Drawing Sheets

GASKETS

BACKGROUND OF THE INVENTION

1. Field of the Invention

The present invention relates to a gasket used for sealing between confronting surfaces of structural components such as cylinder blocks, cylinder heads and others.

2. Description of the Prior Art

Conventionally, a metal gasket has been widely applied to an automotive engine in sealing, for example, between a cylinder block and a cylinder head, which includes a metal plate having on the surfaces thereof beads or grommets that extend along areas surrounding around cylinder bore holes, the metal plate being enclosed on the surfaces thereof with elastic coating. When squeezing the metal gasket of the conventional structure interposed between the cylinder block and the cylinder head, the metal gasket undergoes more compressive stress at the beads, grommets, folded portions or the like, where the elastic coatings are thus strongly forced against the opposing surfaces. This helps ensure the sealing effect to keep high-temperature combustion gases against the leakage out of the cylinder bore through between the confronting surfaces of the metal gasket and either the cylinder block or cylinder head. The exemplary metal gaskets of the prior art as described just above are disclosed in Japanese Patent Laid-Open Nos. 357371/1992; 89114/1997; and 285086/1996.

Nevertheless, since the metal gasket is usually exposed to the repeated very high-gas pressure impact caused by explosion and combustion inside the cylinder, the cylinder head is displaced with respect to the cylinder block at every high pressure impact whereby the metal gasket is made changed in thickness at the sealing areas around the cylinder bores. That is to say, the prior metal gasket has a disadvantage phenomenon that the beads or corrugations on the metal plate is easily made changed in their height and thus the elastic coatings on the metal plate come in elastic deformation, to thereby let the elastic coating and the beads free of compression.

In accordance with the disadvantage as described just above, it will be said the higher the beads and elastic coatings are in their elasticity, the greater will be the degree of the elastic deformation and, therefore, this causes a major problem of fatigue failure of beads and others. To cope with this problem, conventionally, the metal gaskets have come much more complicated in construction. However, the prior complicated metal gaskets result in lacking in flexibility or adaptability to the diverse designs of the engine.

Moreover, the displacement of the cylinder head in the direction across a clearance between the cylinder head and cylinder block depends on spring constant at the areas of the head-to-block sealing for the cylinder bores. That is to say, greater spring constant, or stiffness, results in less displacement. Thus, the displacement of the cylinder head may be made less when the metal plate is made of material higher in elastic coefficient or formed in the construction more in stiffness, instead of forming the beads or providing the elastic coatings. But if considering the compensation for off-alignment between the confronting surfaces and the uniform squeezing force throughout the confronting surfaces, there has been no metal gasket to seal between the confronting surfaces of the cylinder block and the cylinder head or between the adjoining metal plates in the metal gasket with no provision of elastic members. Today, any elastic member or elastic construction has been thus applied to the metal gaskets.

In technology about the metal gaskets, the restraint of the displacement by making use of the material or construction greater in elastic coefficient is inconsistent with the uniform squeezing force throughout the confronting surfaces of the structural components in favor of the elastic effect. An improved metal gasket does not yet developed, which is inexpensively made of a material or formed with a design, which may resolve both the inconsistent needs described just above.

Alternative to the conventional beads corrugated on the metal plate for the head-to-block sealing, even if any other means is developed, which may undergo plastic deformation along with ensuring the sealing effect, it will be thought that it is possible to make the gasket substantially inelastic or stiff with no reduction of elastic coefficient.

Moreover, if the metal gasket may be free from the complicated construction such as beads corrugated on the metal plates for sealing effect, there causes no problem of fatigue failure that might occur at and nearby beads or corrugations. In addition, no need of plastic-metalworking operation to form the beads on the metal plate results in no need of mould, thus making the metalworking steps simple with less production cost of the metal gasket. Moreover, the improved sealing effect renders the metal plates less in number, thus reducing the production cost of the metal gasket.

SUMMARY OF THE INVENTION

A primary object of the present invention is to overcome the problems described above and in particular provide an improvement in a metal gasket used arranged between the confronting surfaces of the structural components and having at least one thin plate that is made with fluid-communication bores. In accordance with the present invention, an improved gasket is proposed, wherein an adhesive provides an area where a thin plate comes in mating with any one of confronting surfaces of the structural components, thereby dealing with relative displacement that might constantly occur between the opposing surfaces of the thin plate and any structural component, in favor of plastic deformation of the adhesive. As a result, the adhesive may make the gasket approach a substantial stiffness without a decline in spring constant to keep the gasket from the fatigue failure that might otherwise occur at or nearby beads formed in the gasket.

The present invention is concerned with an improvement in a gasket used arranged between confronting surfaces of structural components and having at least one thin plate that is made therein with fluid-communication holes, wherein adhesives susceptible to plastic deformation are attached on both opposite surfaces of the plate, which face to the confronting surfaces, to provide mating areas where the adhesives come in adhesion with the confronting surfaces thereby restraining relative displacement between the opposite surfaces of the thin plate and the confronting surfaces of the structural components in favor of at least plastic deformation of the adhesives.

The thin plate may be made of any one of metals and resins. The adhesives are firmly attached to the opposite surfaces of the thin plate by covering the irregularities formed by metalworking on the areas where the thin plate comes in mating with the confronting surfaces. As an alternative, the adhesives may be applied to the opposite surfaces of the thin plate at areas to provide the mating surfaces.

Moreover, where the adhesives are arranged on the thin plate may be suitably preselected depending on the design of the gasket in which the adhesives are required. For example, when arranging the areas for the mating surfaces on both the opposite surfaces of the thin plate, the adhesives are provided on opposite surfaces of the thin plate in coincidence in position with each other. In this design of the adhesives, when the gasket is squeezed between the confronting surfaces, the squeezing force is concentrated on the adhesives overlaid one top on the other, where the compressive sealing stress to press the mating surfaces together increases to help ensure the sealing performance.

With the thin plate being made with irregularities by machining, or scores by cutters, at the areas to provide the mating surfaces, the adhesive of plastic deformation property applied on the surface of the thin plate comes in mating with the scores on the surface of the thin plate and, thus adhered firmly to the thin plate with smoothing the mating surfaces.

In an aspect of the present invention, an improved gasket is provided, wherein the adhesives are each arranged at an annular area of a preselected width, which is spaced away radially from a periphery of the associated fluid-communication hole.

In the modification the adhesive of plastic deformation property is applied on the thin plate, there is no need of initially defining with accuracy the configuration and thickness of the adhesive. For example, the adhesive may be formed in any suitable contour similar to the prior bead worked in thin plate, such as convexity in section, strip uniform in thickness or string. Moreover, it will be appreciated that any number of the areas where the adhesive is applied may be allowed In another aspect of the present invention, a gasket is composed of thin plates overlaid one top on the other, and opposite outward plates have attached with the adhesives on only their areas to come in mating with the confronting surfaces while the residual inward plates adjacent with each other have attached with the adhesives on both opposite surfaces thereof so as to adhere the plates together.

In another aspect of the present invention, the gasket is provided, wherein the thin plate is provided with a half bead formed around the periphery of the associated fluid-communication hole, and the adhesives are arranged at areas nearby the half bead.

In a further another aspect of the present invention, the gasket is provided, wherein the structural components are a cylinder head and a cylinder block to be combined with the cylinder head, the fluid-communication holes are cylinder bore holes made in the thin plate in alignment with cylinder bores in the cylinder block, and the adhesives are arranged around the holes in the thin plate.

It will be preferable to use the adhesive of urethane polymers having heat resistance, plastic deformation property and non-hardening property. As will be seen to those skilled in the art, urethane polymers are not only superior in adhesive property, plastic deformation property and non-hardening property, but also are a substance in liquid form rich in fluidity with adequate viscosity even under ambient temperature. In addition, urethane polymers are superior in water resisting property and oil resistance, and further have not only heat resistance to a high temperature of a range from 200° C. to 300° C., but also are rendered non-hardening even under the temperature range mentioned just above.

With the gasket constructed as described above under favor of the adhesives having the plastic deformation property, the deformation happening constantly at the head-to-block sealing area may be restrained by the plastic deformation of the adhesive, whereas the transitory deformation may be absorbed with the elasticity of the adhesive. That is to say, the bonding characteristic of the adhesives keeps the gasket on sealing against both of the displacement occurring in the direction compressing the gasket and the relative displacement or slippage arising between the confronting surfaces. As a result, the gasket may be free from its own elastic deformation that might be otherwise responsible to the spring constant of a magnitude, which is equivalent to an amount of plastic deformation of the adhesives and thus there is no need of making less the spring constant of the gasket. This makes it possible to protect the gasket against more displacement, keeping the overall gasket on a desired high stiffness.

Even though a minute slippage occurs between the mating surface of the gasket and any confronting surface of the structural components in their plane, the adhesives of plastic deformation property remains bonding together the associated surfaces to keep on sealing. If the relative slippage caused shearing or weakening partially the adhesive, the restoration to the former state would occur in the adhesive owing its plastic deformation property and adhesive property. In this way, the adhesives of plastic deformation property according to the present invention may keep the gasket on sealing regardless of a possible shearing deformation in the adhesive.

The adhesives of plastic deformation property applied about the cylinder bore holes may be a match in sealing performance for the bead in the gasket and thus results in no need of forming the full bead or corrugation surrounding the associated hole on the thin plate. Thus, it will be theoretically said that there is no need of taking together the adhesives of plastic deformation property and the full beads. That is to say, when forming the full bead around the associated hole, no application of the adhesives about the hole may be necessary.

Although the gasket is made of the thin plate as described hereinbefore, in some cases, the thin plate may be of a resin-made plate. For a gasket used between the confronting surfaces of a cylinder head and intake manifold, where the gasket is exposed to a relatively low temperature, for instance, the resin-made plate may substitute for the metal plate.

In accordance with the gasket constructed as described above, the application of the adhesives of, plastic deformation property to the metal plate or resin-made plate at areas to provide sealing surfaces makes it possible to let the gasket approach the substantial stiffness with no reduction of spring constant of the gasket, with keeping the reliable sealing performance, thus resulting in reducing the amount of displacement of the cylinder head.

Moreover, no bead for sealing may be necessary and therefore the gasket is made simple in construction. This resolves the principal drawback of the prior metal gasket: a major problem of fatigue failure that might otherwise occur at or nearby the beads formed in the gasket. Although it is possible to use the adhesives in combination with the half bead, there is little to combine with the full bead and, therefore, there is no need of forming the full bead. Consequently, no need of mould may be necessary, thus making the metalworking steps simple with less production cost of the metal gasket. Moreover, the improved sealing effect renders the metal plates less in number, thus also reducing the production cost of the metal gasket.

Other objects and features of the present invention will be more apparent to those skilled in the art on consideration of the accompanying drawings and following specification wherein are disclosed preferred embodiments of the invention with the understanding that such variations, modifications and elimination of parts may be made therein as fall within the scope of the appended claims without departing from the spirit of the invention.

DETAILED DESCRIPTION OF THE PREFERRED EMBODIMENTS

A gasket according to the present invention will be in detail explained below with reference to the preferred embodiments of the present invention shown in accompanying drawings.

Figure 1:
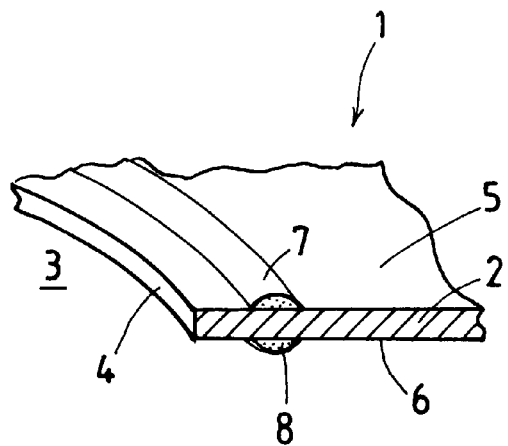
FIG. 1 is a fragmentary perspective view showing a first pre erred embodiment of a gasket according to the present invention.

Referring first to FIG. 1 showing a first preferred embodiment of a gasket according to the present invention, the metal gasket 1 of the first embodiment is composed of a single thin plate 2 to be used interposed between a cylinder block and a cylinder head. The plate 2 is of a plane or flat plate with no beads thereon and made therein with holes 3, which are arranged in alignment with cylinder bores in the cylinder block and defined with circular peripheries 4. Applied on both opposite surfaces 5, 6 of the plate 2, which will come in mating with the confronting surfaces of the cylinder head and cylinder block, are adhesives 7, 8 susceptible to plastic deformation, which are arranged at areas surrounding the periphery 4 of the hole 3. That is to say, the adhesives 7, 8 having plastic deformation property are each arranged at an annular area spaced away radially from the periphery 4 of the associated hole 3 to thereby provide a ring-shaped adhesive mating ridge. In accordance with the first embodiment, the adhesive 7, 8 are formed in beads raised above the surfaces 5, 6 of the thin plate 2. It is preferred that the adhesive 7, 8 extend continuously surrounding the associated holes 3.

Figure 2:
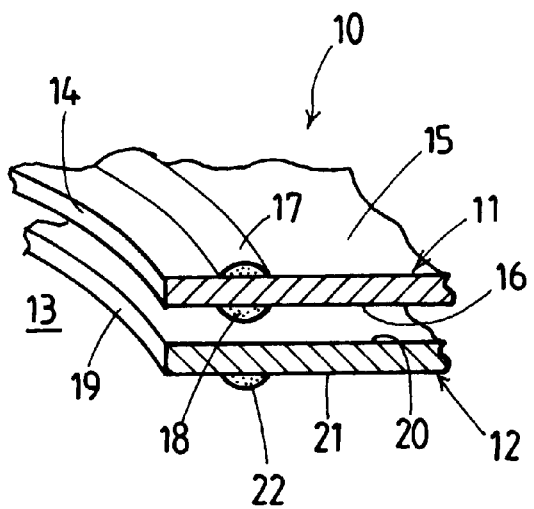
FIG. 2 a fragmentary perspective view showing a second embodiment of a gasket according to the present invention.

Referring to FIG. 2 showing another gasket according to a second embodiment of the present invention, the metal gasket 10 is comprised of two sheets of thin plates 11, 12 interposed between the opposing cylinder block and cylinder head. The thin plates 11, 12, likewise with the plate 2 of the first embodiment, are made therein with holes 13, which are arranged in alignment with cylinder bores in the cylinder block and defined with circular peripheries 14, 19. Any one of the thin plates 11, 12, or the plate 11, is applied on both opposite surfaces 15, 16 thereof with adhesives 17, 18 to plastic deformation property, whereby ring-shaped adhesive mating ridges are provided at annular areas surrounding the associated hole 13. In contrast, another plate 12 has no adhesive on its surface facing to the plate 11, but is applied on its another surface 21 with an adhesive 22 to form a mating ridge at an area substantially corresponding with the adhesive 17, 18 on the counterpart 11.

In accordance with the gasket of the second embodiment, the block-to-head sealing may be ensured by both the adhesive 17 on the surface 15 of the plate 11 and the adhesive 22 on the surface 21 of the plate 12, likewise with the adhesive ridges 7, 8 in the first embodiment. In addition, the adhesive 18 rising above the surface 16 of the plate 11 is to help ensure the sealing effect between the adjacent plates 11, 12. The adhesive 18 is placed in correspondence with other adhesives 17, 22 and, therefore, three adhesive ridges 17, 18 and 22 are overlaid one on top of another to improve the sealing between the gasket 10 and either of the cylinder block and the cylinder head as well as the sealing effect between the adjoining plates 11, 12 of the gasket 10.

Figure 3:
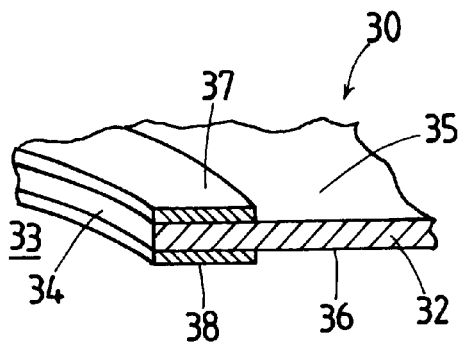
FIG. 3 is a fragmentary perspective view showing a third embodiment of a gasket according to the present invention.

According to a third embodiment of the present invention shown in FIG. 3, a gasket 30 is comprised of a single thin plate 32 that is to be interposed between a cylinder block and a cylinder head. The metal plate 32 is of a flat plate with no beads thereon. Applied on both opposite surfaces 35, 36 of the thin plate 32 are ring-shaped adhesive strips 37, 38, one on each surface, which surround a periphery 34 of a cylinder bore hole 33 with an even thickness and a preselected radial width starting from the periphery 34 of the hole 33. When the gasket 30 is squeezed between the confronting surfaces of the cylinder block and the cylinder head, the adhesive strips 37, 38 are forced in press-mating with the confronting surfaces over relatively wide areas to thereby ensure the reliable block-to-head sealing around the periphery 34 of the hole edge 33.

Figure 4:
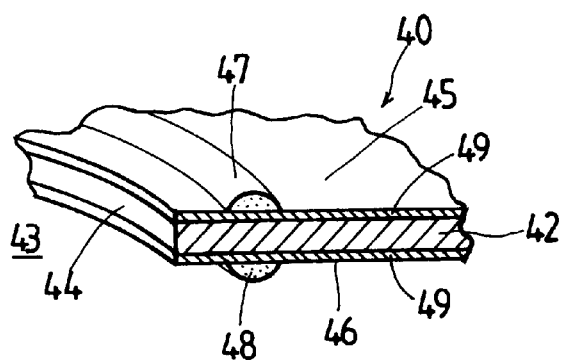
FIG. 4 is a fragmentary perspective view showing a fourth embodiment of a gasket according to the present invention.

Further referring to FIG. 4, there is shown a fourth embodiment of the present invention. This gasket 40 according to the fourth embodiment has a single thin plate 42 of a plane or flat sheet with no beads thereon and made therein with holes 43. The thin plate 42 is provided on both opposite surfaces 45, 46 thereof with elastic coatings 49, one to each surface. Attached on the coatings 49 are adhesives 47, 48 that, similarly to the adhesives 7, 8 in the first embodiment, are formed in ring-shaped beads raised above the surfaces 45, 46 of the plate 40 at annular areas spaced away radially from periphery 44, which defines an associated cylinder bore hole 43. It will be appreciated that the coatings 49, likewise with the coating layers in the prior metal gaskets, is to compensate for minute irregularities present on the confronting surfaces as well as to protect the thin plate 42.

Figure 5:
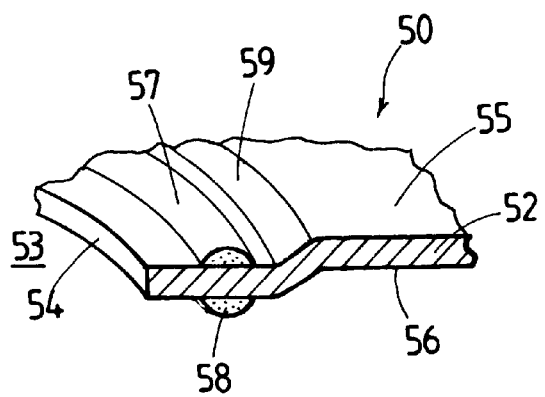
FIG. 5 is a fragmentary perspective view showing a fifth embodiment of a gasket according to the present invention.

Now referring to FIG. 5 where the fifth embodiment of the present invention is illustrated, a metal gasket 50 comprises a thin plate 52 including therein an offset portion in the form of a half bead 59, where adhesives 57, 58 are applied on the opposite surfaces thereof, one to each surface. It will be preferred that the half bead 59 is small in its offset distance. The adhesives 57, 58, likewise with the adhesives in the first to fourth embodiments, are each arranged at an annular area spaced away radially from an associated periphery 54 defining a cylinder bore 53, to thereby provide ring-shaped adhesive mating ridges or beads. When squeezing the metal gasket 50 between the confronting surfaces of the cylinder block and the cylinder head, the compressive sealing stress exerted to the gasket becomes substantially great at the areas where the half beads 59 are forced into press-contact with the confronting surfaces, compared with the sealing stress at the remaining areas of the gasket. This may result in enhancing the performance of the block-to-head sealing at the areas of the half beads. Unlike the full bead, the half bead may be worked with ease and, therefore, contribute to the reduction in production cost of the metal gasket 50. Moreover, the half bead is less subject to the problem of the fatigue failure.

Figure 6:
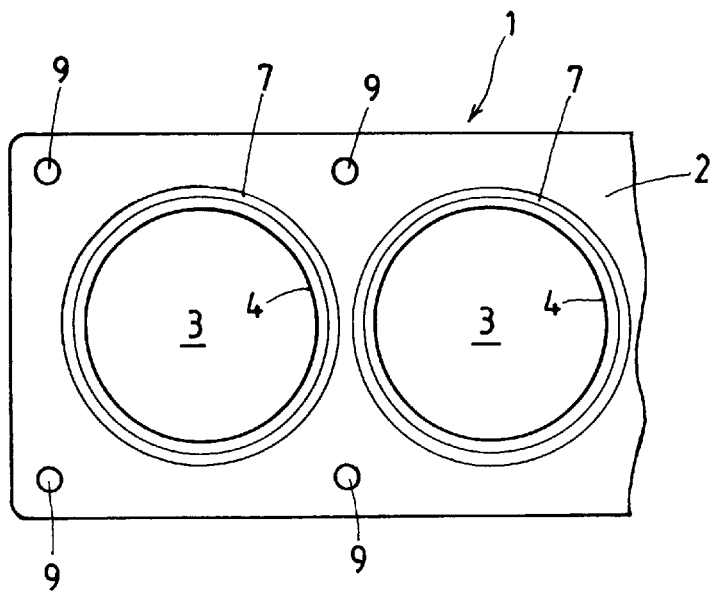
FIG. 6 is a fragmentary plan view of the gasket in FIG. 1.
Figure 7:
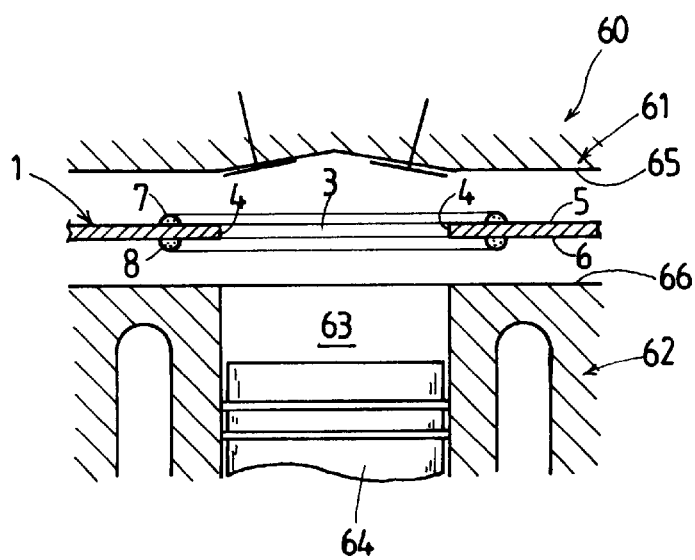
FIG. 7 is a fragmentary schematic section illustrating an engine in which the gasket in FIG. 6 is incorporated between the confronting surfaces of a cylinder block and a cylinder head.

FIG. 6 shows partially the gasket in FIG. 1. Illustrated in FIG. 7 is an engine in which the gasket in FIG. 6 is incorporated between the confronting surfaces of a cylinder block and a cylinder head.

As apparent from FIG. 6, the gasket 1 is a metal gasket for multi-cylinder engine, which is made therein with the holes 3 that are arranged juxtaposed in alignment with cylinder bores 63 in a cylinder block 62, in which pistons 64 move in and out, one in each cylinder bore. The gasket 1 is provided on the opposite surfaces thereof with the annular adhesives 7, 8 surrounding the periphery 4 of the associated hole 3. Bored in the marginal area of the gasket 1 are a plurality of matching holes 9 in which clamping bolts fit to squeeze the gasket 1 interposed between the confronting surfaces 65, 66 of the cylinder head 61 and the cylinder block 62. Besides the matching holes 9 for the clamping bolts, the gasket 1 has therein other holes for purposes as diverse as fluid communication, metalworking and assembling, such as water holes, oil holes, knock-out holes and others. However, these holes are well known to those skilled in the art and therefore the detailed description thereof will be left out.

The gasket 1 is arranged between the confronting surfaces 65, 66 of the cylinder head 61 and the cylinder block 62 in such a relation that the holes 3 are placed in alignment with the cylinder bores 63 and, then, squeezed compressively with the clamping bolts against the confronting surfaces 65, 66. At this event, both the opposite surfaces 5, 6 of the gasket 1 come in mating with the confronting surfaces 65, 66 while the adhesives 7, 8 come in adhesion with their associated confronting surfaces 65, 66 so that the block-to-head sealing may be established to keep the combustion gases against the leakage out of the cylinder bores 63 past the clearances between the confronting surfaces 65, 66.

While there have been shown and described preferred embodiments of the present invention, obviously modifications and variations are possible in light of the above teachings. It is therefore to be understood by those skilled in the art that within the scope of the appended claims, the invention may be practiced otherwise than as specifically described. For example, although the adhesive is formed in an annular bead or strip uniform in its width and thickness throughout the periphery of the cylinder bore hole, it may be alternatively varied in width and height depending on how sealing effect is needed. It will be thus preferable to render the adhesive great in its width and height at areas where the high sealing effect is required, or areas between any adjoining holes in the metal gasket for the multi-cylinder engine, compared with the remaining areas of the gasket. Moreover, it is allowed to merge together the adjacent adhesives, each of which surrounds the periphery of any one of the adjoining holes. In addition, the adhesive may be designed in a multiple ridge such as a double ridge around the periphery of the hole. As an alternative, the half bead described with reference to FIG. 5 is not limited to the area around the cylinder bore hole, but may be formed about the other holes such as water holes, oil holes and the others bored in the metal gasket, in combination with the adhesives attached on the half bead.

What is claimed is:

1. An improvement in a gasket used between confronting surfaces of structural components, the gasket having at least one thin plate that is made therein with fluid-communication holes, the improvement comprising an adhesive susceptible to plastic deformation attached around the fluid communication holes on both opposite surfaces of the at least one thin plate, which faces the confronting surfaces, to provide mating areas where the adhesive comes into engagement with the confronting surfaces thereby restraining relative displacement between the opposite surfaces of the at least one thin plate and the confronting surfaces of the structural components in favor of at least plastic deformation of the adhesive and also making the gasket as a whole solid state to establish a sealing to keep a fluid against leakage out of the confronting surfaces past any clearance between the confronting surfaces, and wherein the adhesive is composed of a liquid urethane polymer having a viscosity capable of keeping form retention when being subject to stress at an ambient temperature, the adhesive exhibiting water resistant, oil resistant, heat resistant and non-curing properties at a temperature condition up to 200~300° C., and the adhesive being attached to the opposite surfaces of the at least one thin plate and, when being squeezed between the confronting structure components, subjected to plastic deformation to be held at sealing areas in favor of not only adhesiveness of the deformed adhesives in themselves with the opposite surfaces and the confronting surfaces but also joint retention characteristics of the adhesive.

2. An improvement according to claim 1, wherein the at least one thin plate is made of any one of metals and resins.

3. An improvement according to claim 1, wherein the adhesive is firmly attached to the opposite surfaces of the at least one thin plate by covering irregularities formed on the opposite surfaces by metalworking on the areas where the at least one thin plate comes into engagement with the confronting surfaces.

4. An improvement according to claim 1, wherein the adhesive is applied to the opposite surfaces of the at least one thin plate at areas to provide mating surfaces.

5. An improvement according to claim 1, wherein the adhesive provides on opposite surfaces of the at least one thin plate are in coincidence in position with each other.

6. An improvement according to claim 1, wherein the adhesive is arranged at an annular area of a preselected width, which is spaced away radially from a periphery of the associated fluid-communication hole.

7. An improvement according to claim 1, wherein the adhesive is arranged along an annular area spanning radially a preselected width from a periphery of the associated fluid-communication hole.

8. An improvement according to claim 1, wherein the adhesive is formed in beads raised above the surfaces of the at least one thin plate.

9. An improvement according to claim 1, wherein the adhesive is attached on the surfaces of the at least one thin plate in an uniform thickness.

10. An improvement according to claim 1, wherein coatings are formed on the opposite surfaces of the at least one thin plate, one to each surface, and the adhesive is arranged on the coatings.

11. An improvement according to the claim 1, wherein the gasket is composed of a plurality of thin plates overlaid one top on the other, and the adhesive is applied to outside surfaces of the opposite outward plates, which engage the confronting surfaces, and also applied to opposite surfaces of residual inward plates adjacent to each other.

12. An improvement according to claim 1, wherein the at least one thin plate is made with half beads along the peripheries of the fluid-communication holes and the adhesive is arranged in areas neighboring the half beads.

13. An improvement according to claim 1, wherein the structural components are a cylinder head and a cylinder block to be combined with the cylinder head, the fluid-communication holes are cylinder bore holes made in the thin plate in alignment with cylinder bores on the cylinder block, and the adhesive is arranged around the holes in the thin plate.

* * * * *